United States Patent [19]

Kawashima et al.

[11] Patent Number: 5,016,986
[45] Date of Patent: May 21, 1991

[54] DISPLAY DEVICE HAVING AN IMPROVEMENT IN INSULATING BETWEEN CONDUCTORS CONNECTED TO ELECTRONIC COMPONENTS

[75] Inventors: Akihiro Kawashima, Tenri; Hirokazu Yoshida, Osaka; Yasunobu Tagusa, Kitakatsuragi; Kiyoshi Inada, Joyo; Hideshi Makita, Tenri; Yoshihisa Dotta, Tenri, all of Japan

[73] Assignee: Sharp Kabushiki Kaisha, Osaka, Japan

[21] Appl. No.: 337,155

[22] Filed: Apr. 12, 1989

[30] Foreign Application Priority Data

Apr. 12, 1988 [JP] Japan .................. 63-91178

[51] Int. Cl.$^5$ .................. G02F 1/13; G03C 5/00
[52] U.S. Cl. .................. 350/339 R; 350/334; 350/336; 430/311
[58] Field of Search ........... 350/332, 336, 334, 339 R; 430/311, 317, 319

[56] References Cited

U.S. PATENT DOCUMENTS

| | | | |
|---|---|---|---|
| 4,295,711 | 10/1981 | Tanaka et al. | 350/334 |
| 4,478,690 | 10/1984 | Scholtens | 350/339 R X |
| 4,630,355 | 12/1986 | Johnson | 350/333 X |
| 4,640,581 | 2/1987 | Nakamowatari et al. | 350/336 X |
| 4,643,526 | 2/1987 | Watanabe et al. | 350/332 |
| 4,721,365 | 1/1988 | Nishimura | 350/336 |
| 4,735,890 | 4/1988 | Nakane | 430/311 |
| 4,826,297 | 5/1989 | Kubo et al. | 350/339 R |

FOREIGN PATENT DOCUMENTS

| | | | |
|---|---|---|---|
| 57-164716 | 10/1982 | Japan | 350/339 R X |
| 61-123818 | 6/1986 | Japan | 350/334 X |
| 63-55526 | 3/1988 | Japan | 350/336 |
| 2151834A | 12/1984 | United Kingdom | 350/332 |

Primary Examiner—Stanley D. Miller
Assistant Examiner—Huy K. Mai

[57] ABSTRACT

In a liquid crystal display apparatus, in order to reduce the size and weight, an integrated circuit for driving a liquid crystal is mounted on the glass substrate including the liquid crystal panel either directly or by way of a tape carrier. That is, two glass substrates of liquid crystal panel are mutually overlapped with an offset, and a liquid crystal material is injected into the overlapping regions of the two glass substrates, and liquid crystal display is effected in this region. Further, in the non-overlapping region of the two glass substrates, the integrated circuit is connected either directly or by way of a tape carrier. On the glass substrates, electrodes for varying the optical characteristics of the liquid crystals are provided, and the integrated circuit drives the liquid crystal by controlling the voltage applied to the electrodes. Further transparent insulation films are formed usually formed on the electrodes. The transparent insulation films are also formed in the non-overlapping region of the glass substrates. Since the transparent insulation films are finely patterned by photolithography, they may be selectively formed on the portions where defective insulation is likely to occur between the wiring conductors following the integrated circuit from the electrodes, or between the integrated circuit and the peripheral portion of the connecting part.

12 Claims, 9 Drawing Sheets

DISPLAY DEVICE HAVING AN IMPROVEMENT IN INSULATING BETWEEN CONDUCTORS CONNECTED TO ELECTRONIC COMPONENTS

BACKGROUND OF THE INVENTION

1. Field of the Invention

The present invention relates to an electronic apparatus utilizable in a display device such as a liquid crystal display device, and more particularly to possessing a structure in which an integrated circuit or a tape carrier attached to which an integrated circuit is attached is connected to, for example, a glass substrate of a display panel.

2. Description of the Prior Art

Figure 1:
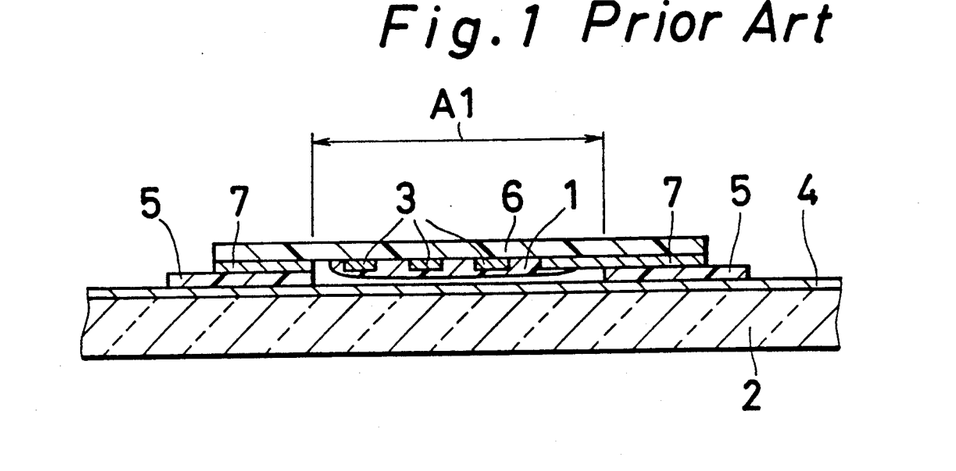

Hitherto, in order to realize reduction of size and lowering of cost of a liquid crystal display device, a method of connecting a tape carrier to which an integrated circuit for driving the liquid crystal directly attached to a glass substrate composing the display panel has been known. FIG. 1 is a sectional view showing the structure near a tape carrier 6 of a conventional liquid crystal display device. Two glass substrates composing the liquid crystal panel are overlapped with an offset. Therefore, one glass substrate 2 possesses a region not overlapping with the other glass substrate. In this region, the tape carrier 6, to which an integrated circuit (not shown) or the like for driving the liquid crystal is attached, is connected. In the overlapping region of the two glass substrates, liquid crystal material or the like is sealed in, so as to effect liquid crystal display in this region.

On the surface of the glass substrate 2, a common conductor 4 for signal input is disposed. On the surface of the tape carrier 6 confronting the glass substrate 2, an input signal conductor 3 and a connecting conductor 7 are formed. This connecting conductor 7 is connected to the common conductor 4 for signal input by way of an anisotropic conductive film 5.

In such connection structure, in the region indicated by reference code A1 in FIG. 1, the input signal conductor 3 on the tape carrier 6 and the common conductor 4 for signal input formed on the glass substrate 2 cross over to form a multilayer conductor structure. Conventionally, to prevent short-circuit of the input signal conductor 3 and the common conductor 4 for input signal, a resist 1 such as an electrically insulating resin was applied on the input signal input conductor 3. By this resist 1, the input signal input conductor 3 on the tape carrier 6, and the common conductor 4 for signal input on the glass substrate 2 are insulated from each other.

In such a conventional device, the tape carrier 6 is deformed in the region indicated by reference code A1. Such deformation of the tape carrier 6 is considered to be caused by a relatively large thickness of the resist 1, and difference in the thermal expansion coefficient of the resist 1 and the tape carrier 6. By such deformation of the tape carrier 6, a stress is caused in the connection part of the common conductor 4 for signal input and the connecting conductor 7. Their may result in a defective connection or the like.

The conductor from the tape carrier 6 to the display region is formed on the surface of glass substrate 2. In such a conductor layout area, it is necessary to arrange conductors at high density by narrowing the conductor clearances. However, if the spacing between conductors is too narrow, due to dew condensation of moisture, defective insulation occurs. Hence there is a limit to the miniaturization of wiring conductors. In addition, in the narrow conductor spacing area, defective insulation due to foreign deposit may also take place.

Meanwhile, in the face-down bonding method of directly connecting the integrated circuit to the glass substrate, the above technical problems are not solved. In this case, moreover, positioning of high precision is required in connecting the integrated circuit to the glass substrate. That is, where the conductor interval is narrow in the connecting part, a slight dislocation may give rise to short-circuit or leak between the connecting electrode of the integrated circuit and the conductor adjacent to the connecting position of the glass substrate. Furthermore, in the case of connection of the integrated circuit directly to the glass substrate, when a conductive paste is used as the connecting material, this conductive paste may be spread widely and unexpectedly when connecting. This may also lead to short-circuit or leak between the adjoining conductors.

SUMMARY OF THE INVENTION

It is hence a primary object of the invention to present an electronic apparatus capable of forming conductors finely by enhancing the insulation performance between conductors on a substrate to which electronic circuit component is connected, or between the conductor and a connecting electrode of the electronic circuit to be insulated from each other, and also a method for fabricating a display device.

In order to achieve the above object, the invention discloses an electronic apparatus having a conductor and an electrically insulating layer formed by photolithography, piled in this order on an electrically insulating substrate, and also having an electronic device formed in an electronic device forming region together with the conductor and the electrically insulating layer. The device includes: an electronic circuit component on which the bonding electrode is formed;

the conductor formed not only in the electronic device forming region but also in a region other than the electronic device forming region on the circuit substrate; and the electrically insulating layer formed so as to cover part of the conductor, in the region other than the electronic device forming region on the substrate.

The bonding electrode is further bonded to a bond region of the conductor not covered with the electrically insulating layer on the substrate.

According to this invention, the electrically insulating layer is selectively formed in the region other than the electronic device forming region of the substrate by photolithography. Besides, on the electronic circuit component, a bonding electrode is formed, and is connected to the substrate in the bond region of the conductor free from the electrically insulating layer.

Therefore, since the insulation performance between the conductors in the region other than the electronic device forming region is enhanced by the electrically insulating layer for forming the electronic device, defective insulation between the conductors may be prevented without complicating the manufacturing process.

Thus, according to the invention, the electronic device is composed by forming an electrically insulating layer by photolithography on the electrically insulating substrate on which the conductors are formed. At this time, since the electrically insulating layer is selectively formed in the region other than the electronic device forming region, as far as this electrically insulating layer is formed in the region where the conductors are formed, the insulation between the wiring conductors may be enhanced. Thus, fine and high density formation of the conductor may be realized.

Besides, by forming the insulating layer in the non-bonding region between the electronic circuit component and the substrate, it is possible to insulate while eliminating the adverse effects on the connection due to the great thickness of the resist as mentioned in relation to the conventional devices. Still further, in the forming process of the electrically insulating layer when composing the electronic device, the electrically insulating layer can be formed in the region other than the electronic device forming region. Thus, the manufacturing process of the electronic device may be simplified.

When such connection is employed in a liquid crystal display apparatus, a liquid crystal display device possessing the display region as the electronic device may be formed.

Therefore, the invention also presents a liquid crystal display apparatus including:

a liquid crystal display device having a pair of electrically insulated substrates mutually overlapping with an offset, on each surface mutually confronting of the overlapping region, a conductor and an electrically insulating layer are formed by photolithography piled in this order, and between the pair of substrates, a liquid crystal material is injected; and electronic circuit components, each of them having a bonding electrodes, connected to the substrate, and for driving the liquid crystal device. The apparatus further includes:

the electrically insulating layer and the conductor being selectively formed, not only in the overlapping region, but also in the non-overlapping region of the substrate respectively, and the bonding electrode of the electronic circuit component being bonded to a bond region of the conductor not covered with the electrically insulating layer on each circuit substrate.

According to the invention, the electronic circuit component may be either a tape carrier to which an integrated circuit is attached, or also an integrated circuit bonded to the substrate face down.

According to a preferred embodiment of the invention, the electrically insulating layer is formed in a region excluding the bond region corresponding to the bonding electrode disposed in the integrated circuit, in the overlapped region with the integrated circuit. This electrically insulating layer may be also formed in overlap with the conductor in the bond region in its peripheral portion.

According to another preferred embodiment of the invention, the electrically insulating layer is formed so as to cover the conductor along the wiring conductor except in the bond region, in the overlapped region of the integrated circuit. This electrically insulating layer may be formed to cover only the region of the conductor which is not connected to the bonding electrode and near the bond region, in the overlapped region of the integrated circuit.

In these ways, by forming the electrically insulating layer, connecting the integrated circuit to the substrate, and injecting an electrically insulating synthetic resin between the integrated circuit and the substrate, the integrated circuit can be conneted firmly to the circuit substrate, without decreasing the insulating performance between the conductors as stated above, even when the adhesion between the electrically insulating layer and the synthetic resin is weak.

The electrically insulating layer of the invention may be selectively formed by forming a thin layer made of $SiO_2$ or $SiN_x$ a preferably by a sputtering method, CVD method or other thin layer forming technique, and patterning this thin layer by employing a photolithographic technique.

BRIEF DESCRIPTION OF THE DRAWINGS

These and other objects of the invention, as well as the features and advantages thereof, will be better understood and appreciated from the following detailed description taken in conjunction with the drawings, in which:

FIG. 1 is a sectional view showing the structure near a tape carrier 6 of a conventional liquid crystal display device of;

DETAILED DESCRIPTION OF THE PREFERRED EMBODIMENTS

Referring now to the drawings, preferred embodiments of the invention are described in details below.

Figure 2:
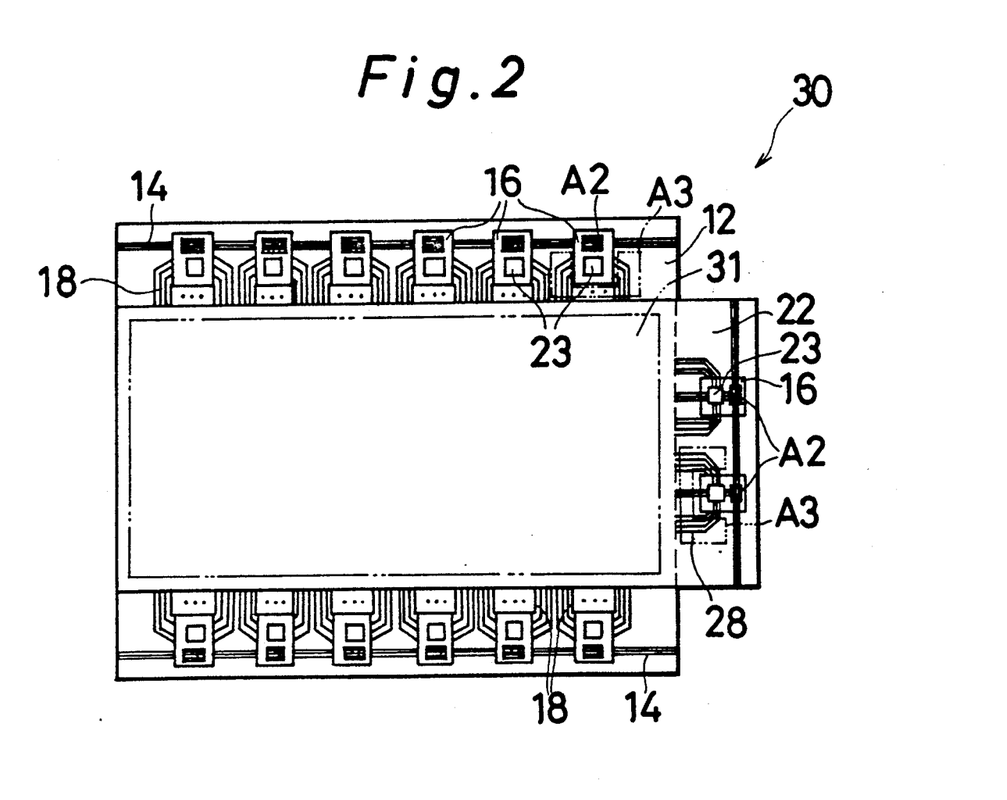
FIG. 2 is a plan view showing the entire structure of a liquid crystal display device 30 in one of the embodiments of the invention.

FIG. 2 is a plan view showing the entire structure of a liquid crystal display device 30 according to the invention. The liquid crystal display device 30 is composed by laminating two glass substrates 12, 22 as a pair of substrates. These two glass substrates 12, 22 are overlapped with an offset, and possess regions not overlapping with each other. In these regions, plural integrated circuits 23 for driving the liquid crystal are connected individually through tape carriers 16.

The tape carrier 16 is intended to connect the integrated circuit 23 electrically to the glass substrates 12, 22, and it is made of an elastic film. As mentioned later, in this display region 31, intervening between the two glass substrates 12, 22, there are a color filter, a transparent electrode, a transparent insulation film made of electrically insulating film, an orientation film and a liquid crystal. Thus, liquid crystal display is realized.

An input signal is given from a common conductor 14 for signal input to the integrated circuit 23 through a tape carrier 16. This common conductor 14 for signal input is formed on the surface of the glass substrate 12.

The output signal from the integrated circuit 23 is applied to an electrode 18 through the tape carrier 16. The electrode 18 is disposed in the region on the glass substrate 12 from the tape carrier 16 to the display region 31. Such structure is similar in the region not overlapping with the glass substrate 12 of the glass substrate 22. The electrodes 18, 28 from the tape carrier 16 compose a matrix by extending longitudinally and laterally in the display region 31, and a two-dimensional display is achieved on the display region 31.

In this embodiment, the transparent insulation layer is formed, as mentioned later, not only in the display region 31, but also in the overlapping region A2 with the tape carrier 16 and the exposed region A3 of the electrodes 18, 28.

Figure 3:
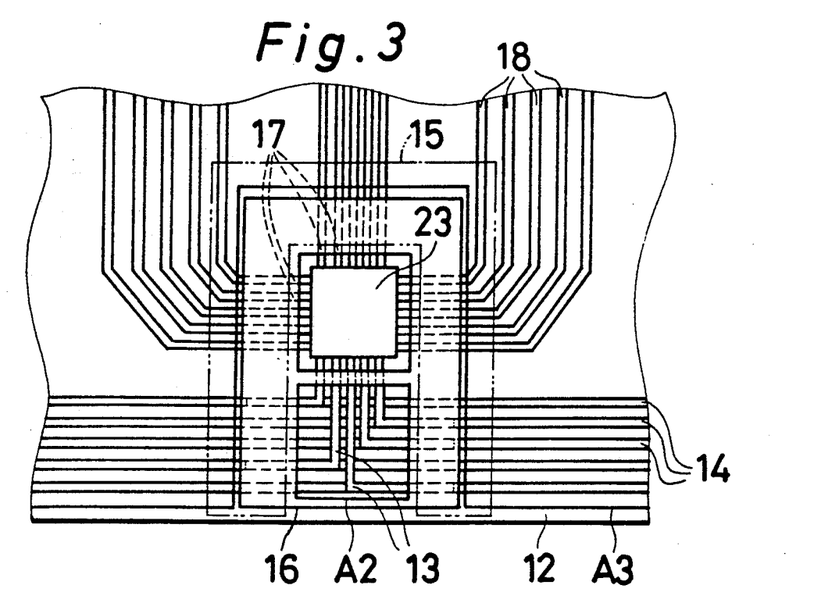
FIG. 3 and FIG. 4 are a plan view and a perspective view showing the structure near a tape carrier 16 of a liquid crystal display device 30.
Figure 4:
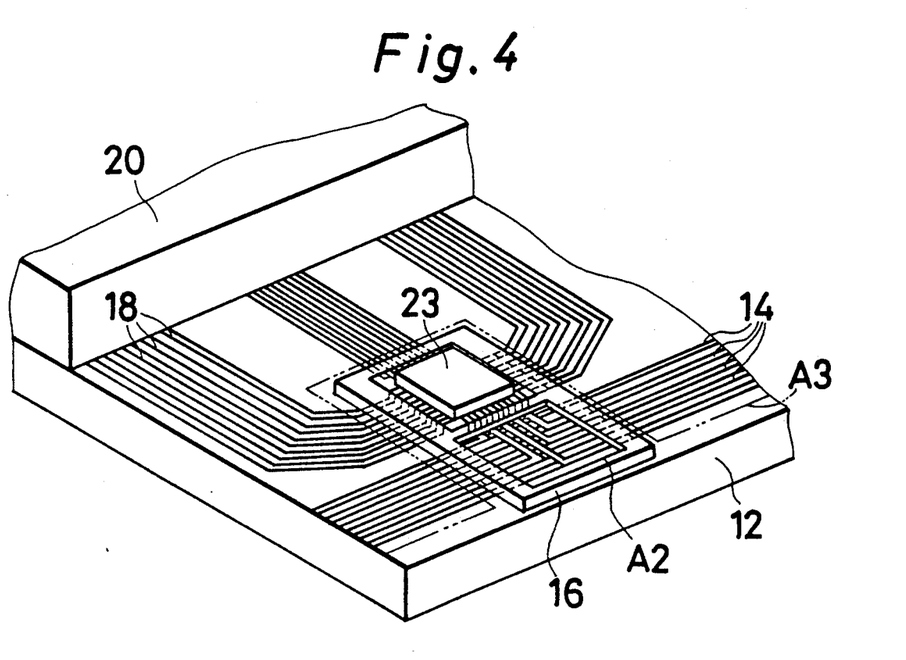

FIG. 3 is a plan view showing the structure near the tape carrier 16 of the liquid crystal display device 30, and FIG. 4 is a perspective view showing this structure. On the surface of the glass substrate 12, the electrode 18 and common conductor 14 for signal input are formed.

The common conductor 14 for input signal and electrode 18 formed on the glass substrate 12 are made of, for example, ITO (indium-tin oxide) or another metal film.

Furthermore, in the regions A2 and A3, to be mentioned subsequently transparent insulation layers are formed. The transparent insulation layers are, for example, $SiO_2$ and $SiN_x$, and are formed by a sputtering method, a CVD method or the like in the forming process of liquid crystal panel 20. Thus, fine patterns may be easily formed by photoetching or photolithography.

The manufacturing process of this transparent insulation layer is explained below. On the entire surface of the glass substrate 12, on which the electrode 18 and common conductor 14 for signal input are formed, a thin layer of $SiO_2$ or $SiN_2$ is formed in a layer thickness of, for example, 3000 Å. Furthermore, a photosetting photo resist is applied on the entire surface, and it is irradiated with light through a mask with a desired pattern. Dipping in a solvent in this state, the photo resist which is not cured is dissolved and removed. Moreover, by the wet etching or dry etching method, the portion of $SiO_2$ or $SiN_x$ exposed by the removal of the photo resist is removed. As a result, the $SiO_2$ or $SiN_x$ layer is formed in a pattern, and the remaining photo resist is removed. A transparent insulation layer is formed later.

On the other hand, an input signal conductor 13 is formed on the surface of the tape carrier 16 confronting the glass substrate 12, and the input signal input conductor 13 and the corresponding common conductor 14 for input signal are electrically connected individually by means of an anisotropic conductive film 15.

The tape carrier 16 is composed of, for example, an organic resin film of a small in thermal expansion coefficient. The signal input conductor 13 and connecting conductor 17 formed on the tape carrier 16 are, for example, made of copper foil, tin foil or tin-plated copper foil, and they can be arranged finely and at high density by applying the techniques of thin film pattern processing or the like. The anisotropic conductive film 15 is composed of, for example, a sheet of about 25 μm in thickness having Ni (nickel particles) of 5 to 20 μm in diameter dispersed, and the heated and compressed portion becomes conductive in the compressing direction. This anisotropic conductive film 15 also possesses the function for mechanically connecting the tape carrier 16 and the glass substrate 12.

In the region A2 of the overlapped region of such a tape carrier 16 to the glass substrate 12, the input signal conductor 13 and the common conductor 14 for input signal are not connected, and a multilayer structure is built up. In the region A3 on the glass substrate 12, the electrode 13 is exposed.

In this embodiment, by the transparent insulation layer formed in the region A2, the insulation of the input signal conductor 13 and the common conductor 14 for input signal is achieved. Further by the transparent insulation layer being formed in the region A3, defective insulation between electrodes 18 due to foreign deposit may be prevented.

Figure 5:
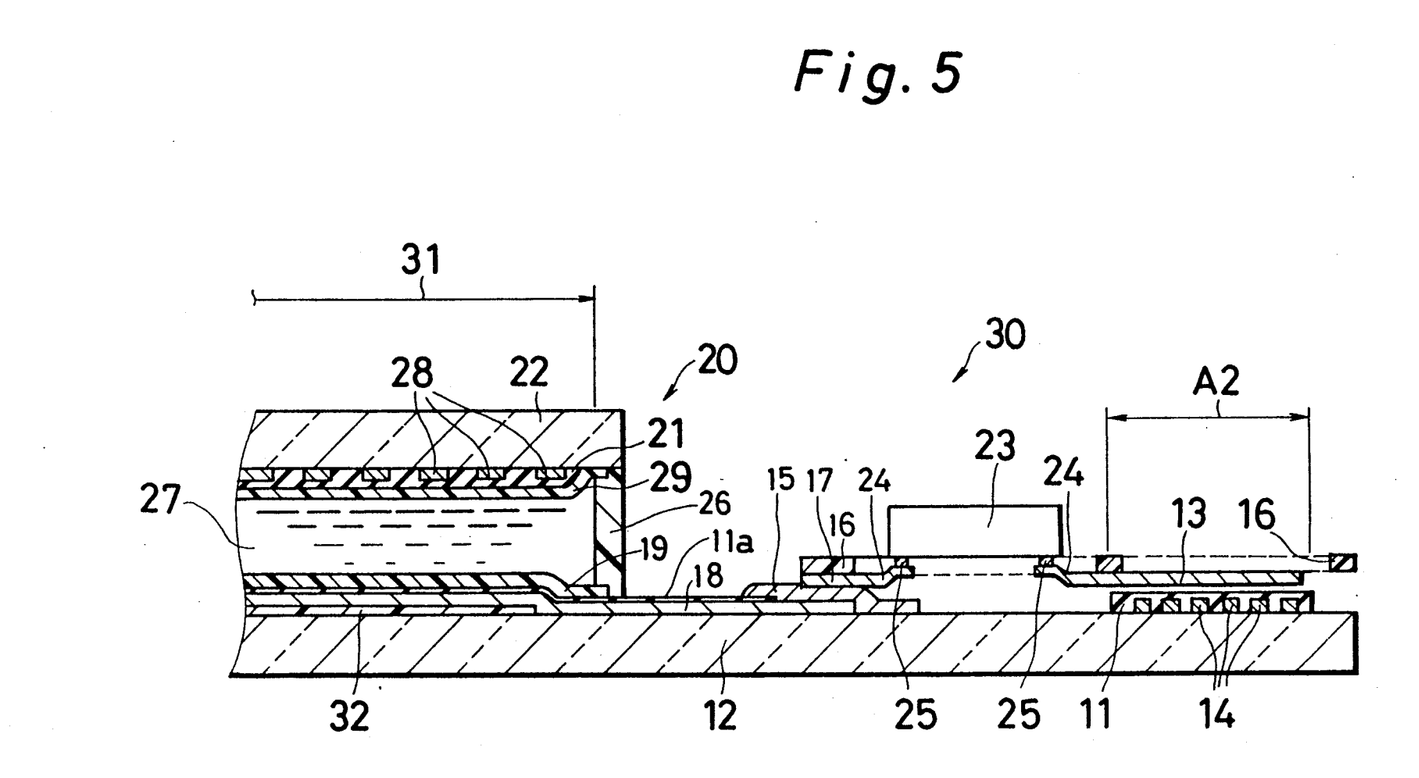
FIG. 5 is a sectional view near the tape carrier 16 of the liquid crystal display device 30.
Figure 6:
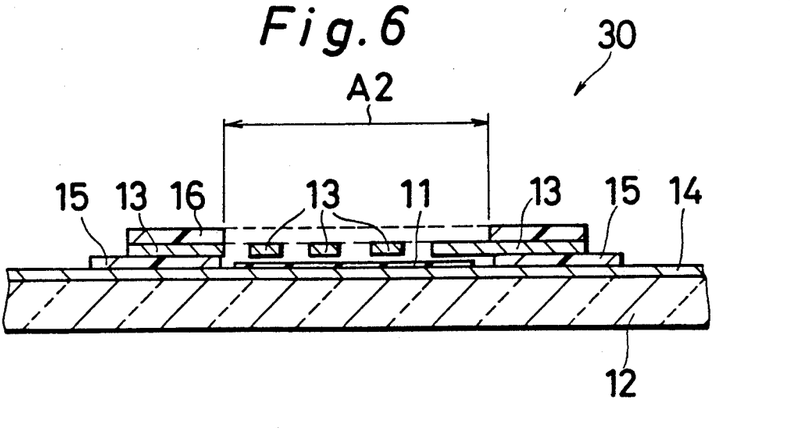
FIG. 6 is a sectional view near the tape carrier 6, cutting off the liquid crystal display device 30 along the common conductor 14 for input signal.

FIG. 5 is a sectional view of the liquid crystal display device 30, and FIG. 6 is a sectional view near the tape carrier 16 showing the liquid crystal display device 30 cut off along the common conductor 14 for input signal. As stated above, the integrated circuit 23 for driving the liquid crystal is mounted on the tape carrier 16. An output wire 24 from this integrated circuit 23 is bonded to an inner lead by bumps 25, and is individually connected to the input signal conductor 13 and electrode 18 by way of anisotropic conductive film 15, solder or other connecting material.

The display panel 20 positioned at the left side in FIG. 5 is composed by laminating the glass substrate 12 on which a segment electrode 18 is formed, and the glass substrate 22 on which a common electrode 28 is formed. On the glass substrate 12, as mentioned above, color filter 32 and electrode 18 are formed, and a transparent insulation layer 11a is formed on this electrode 18. On the transparent insulation layer 11a corresponding to the display region 31 of the display panel 20, an alignment layer 19 is formed. Similarly, on the glass substrate 22, electrode 28, transparent insulation layer 21 and orientation film 29 are formed. The glass substrate 12 and glass substrate 22 are fixed by way of sealing material 26, and a liquid crystal is intervening between the alignment layer 19 and the alignment layer 29.

In such display panel 20, a voltage is selectively applied in each picture element between the electrodes 18, 28 by the signal delivered from the integrated circuit 23 to the electrode 18, and the signal led out to the electrode 28, and the optical characteristic of the liquid crystal 27 varies, so that the liquid crystal is realized.

Hereinafter, referring to FIG. 5 and FIG. 6, the structure near the connecting part of the tape carrier 16 and glass substrate 12 is described in detail. On the common conductor 14 for input signal input formed on the glass substrate 12, the transparent insulation layer 11 is formed in the same process as in the transparent insulation layer in the region A2, A3 as mentioned above. The region A2 is an area in which the common conductor 14 for signal input and input signal conductor 13 cross over to build up a multiplayer conductor structure. Usually, in this region A2, a short-circuit between conductors is likely to occur.

However, in this embodiment, since the transparent insulation layer 11 is formed, the short-circuit between the conductors is prevented, and a secure insulation is achieved.

In the region other than the region A2, the connecting conductor 17 and the electrode 18, and the input signal conductor 13 and the common conductor 14 for input signal are electrically and mechanically connected with each other respectively, by way of the anisotropic conductive film 15. In such a connecting position, the transparent insulation layer 11 is not formed.

Thus, in the liquid crystal display device 30, since the transparent insulation layer 11 is formed in the region A2, it is not necessary to apply a resist or the like as explained in relation to the conventional art, and the connecting process of the tape carrier 16 is simplified. Further, the yield in connection of the tape carrier 16 is enhanced.

Moreover, since this transparent insulation layer 11 is a thin film, its thickness is not as great as that of the resist. Further, since it is not directly adhered to the tape carrier 16, it is free from adverse effects of difference in the thermal expansion coefficient between the tape carrier 16 and the resist. Accordingly, the tape carrier 16 is not deformed in the region A2. Therefore, since stress is not generated in the connecting portion of the input signal conductor 13 and common conductor 14 for input signal, adverse effects on connection are eliminated, and the reliability of connection is enhanced. At this time, the transparent insulation layer 11 is a thin film, and the yield in the connecting process by the anisotropic conductive film 15 is enhanced. Thus, the cost of the entire apparatus may be lowered at the same time.

Furthermore, in the region A3, since the transparent insulation layer 11 is formed, the insulation between the adjoining electrodes 18 is improved, and defective insulation between the electrodes 18 due to dew condensation of moisture may be prevented. At the same time, defective insulation due to foreign deposit is preventd, so that fine patterning and high density of the electrodes 18 may be achieved at the same time. Besides, since such transparent electrode insulation layers 11 can be formed in the fabricating process of the display panel 20, these effects will be realized without complicating the manufacturing process.

In this embodiment, it is composed to form the transparent insulation layers 11 in the region A2 and the region A3, but it is also possible to form the transparent insulation layer 11 either in the region A2 or A3. Further, the transparent insulation layer 11 may be also formed in part of such regions or in the portion other than such regions. In such a case, in this invention, since the transparent insulation layer 11 is patterned at high density by photolithography, the transparent insulation layer 11 may be selectively formed in a desired region, for example, in the region where the defective insulation of the electrode 18 is likely to occur. Or, when the tape carrier is connected to an ordinary printed circuit board comprising common conductor for signal input and this tape carrier is connected to the glass substrate, the transparent insulation layer 11 is preferably formed on the electrode extending from the tape carrier to the display region.

Figure 7:
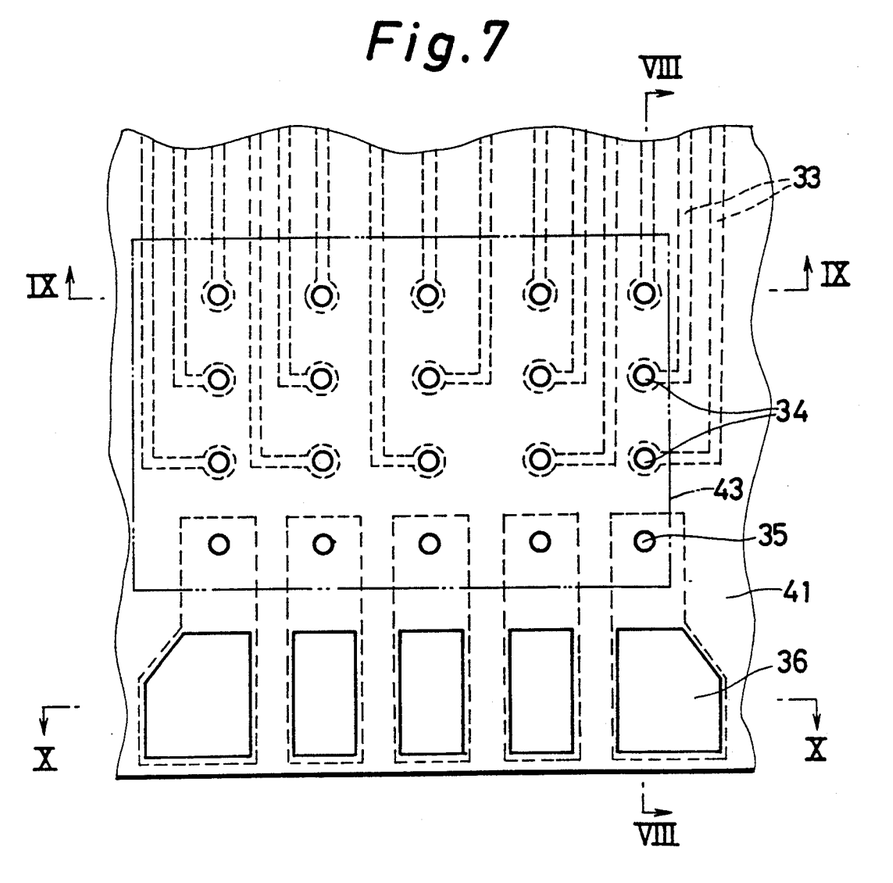
FIG. 7 is a plan view showing the connecting structure of an integrated circuit 43 to a glass substrate of a liquid crystal display device in another embodiment of the invention.
Figure 8:
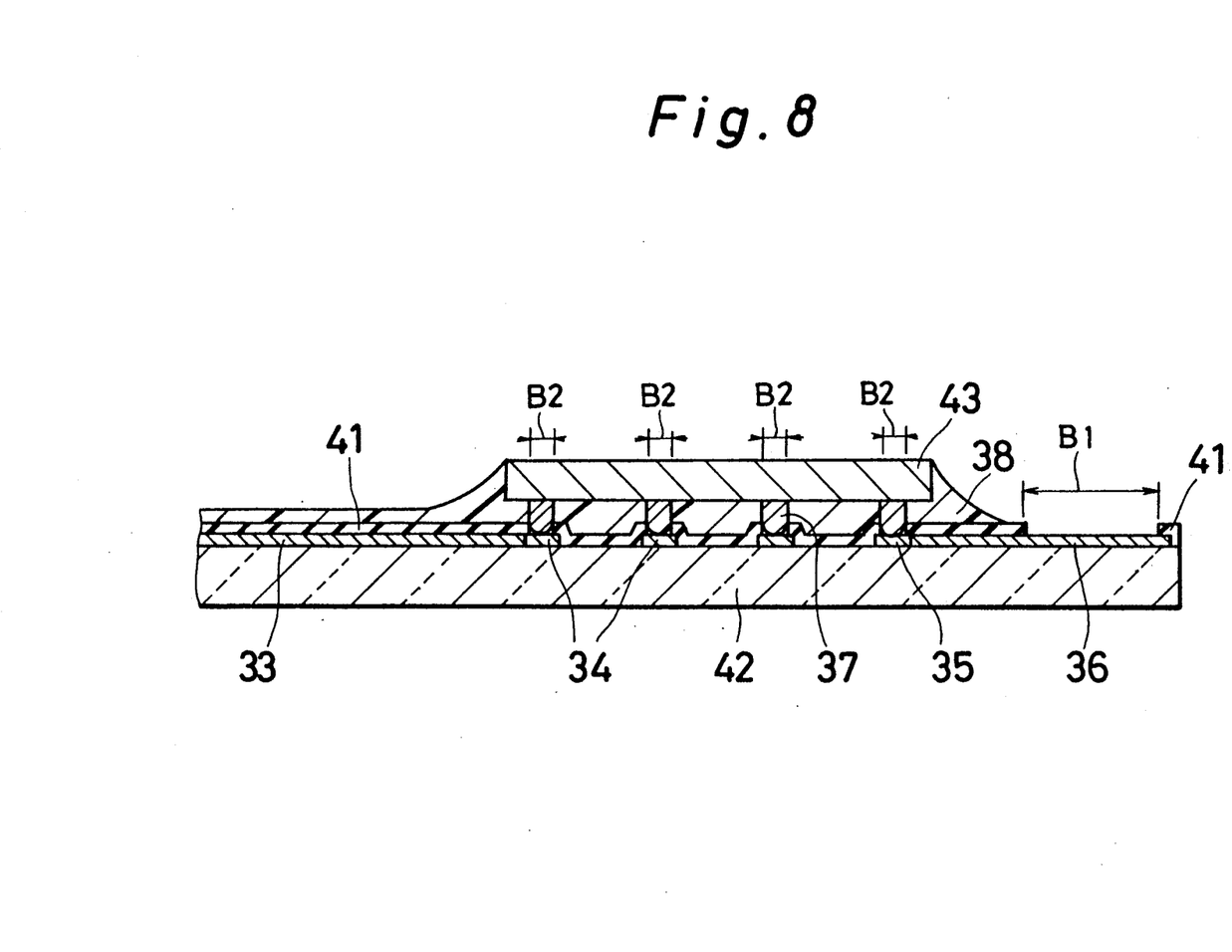
FIG. 8 is a sectional veiw seen from cutoff line VIII—VIII of FIG. 7.
Figure 9:
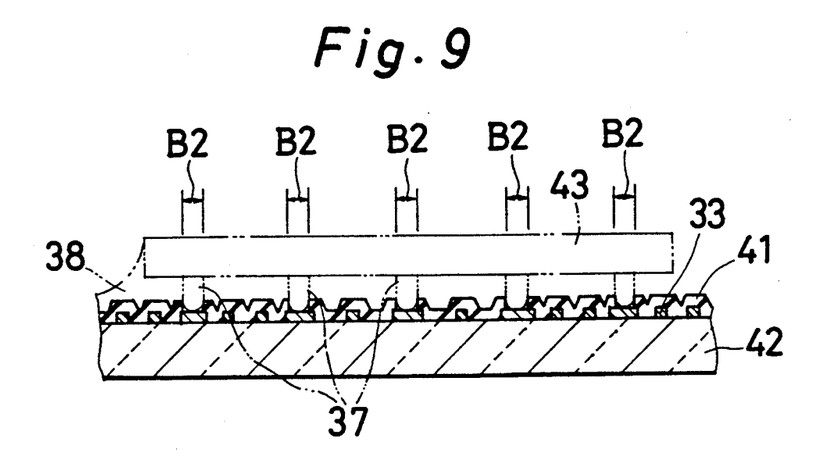
FIG. 9 is a sectional view seen from cutoff line IX—IX of FIG. 7.
Figure 10:
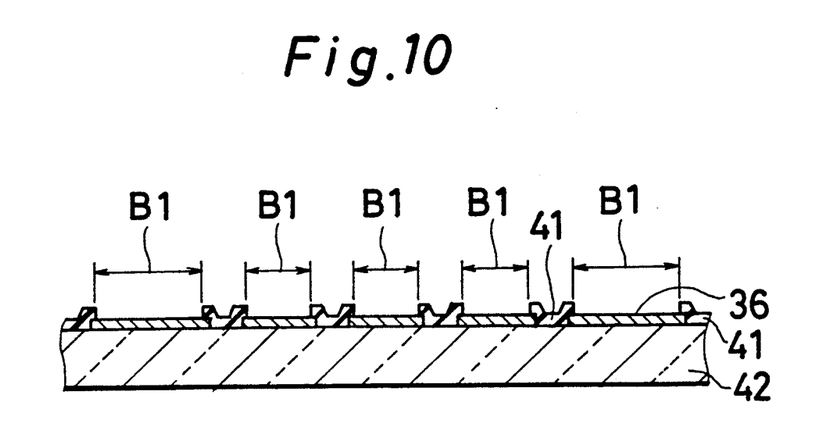
FIG. 10 is a sectional view seen from cutoff line X—X of FIG. 7.

FIG. 7 is a plan view showing the connection structure of integrated circuit 43 to a glass substrate 42 in a liquid crystal display device in another embodiment of the invention. FIG. 8 is a sectional view seen from cutoff line VIII—VIII of FIG. 7. FIG. 9 is a sectional view seen from cutoff line IX—IX of FIG. 7. Further, FIG. 10 is a sectional view seen from cutoff line X—X of FIG. 7. In this embodiment, the integrated circuit 43 is directly connected to the region not overlapping between one glass substrate 42 and the other glass substrate in the liquid crystal display device. In the other glass substrate, similarly, an integrated circuit may be connected.

Referring to FIGS. 7 to 10, on one surface of the glass substrates 42, output electrode 34, input electrode 35 and output conductor 33 are formed, for example, in the same process together with the picture element electrode or scanning electrode in the liquid crystal display device. Such electrodes are selectively formed by, for example, photolithography, and are composed of ITO or other metal thin film.

On the glass substrate 42, furthermore, a transparent insulation film 41 is formed as an electrically insulating film. This transparent insulation layer 41 is, the same as in the foregoing embodiment, for example, $SiO_2$ or $SiN_x$, and is formed in a film shape by sputtering method, chemical CVD method or the like, and is patterned by photolithography. As shown in FIG. 8 to 10, the transparent insulation layer 41 is not formed in the region, B1, B2, to which the input electrode 35, output electrode 34 and input terminal 36 are connected.

On the other hand, the integrated circuit 43 has a function for driving the liquid crystal display device, and a bump electrode 37 is formed in order to exchange signals with the outside. This bump electrode 37 is formed by selectively applying a resist by photolithography, and applying copper by electroplating. In another embodiment, meanwhile, a bump electrode made of gold may be formed by the same way as a fast bond of wire bonding method.

This bump electrode 37 is electrically connected to the region B2 in which the output electrode 34 and the input electrode 35 are exposed. Thus, the integrated circuit 43 is electrically connected with the output electrode 34 and the input electrode 35 of the glass substrate 42. As for the connection of the bump electrode 37, and output electrode 34 or the input electrode 35, for example, a conductive paste may be used, or they may be directly connected by compressing. Otherwise, without forming the bump electrode 37, the integrated circuit and the output electrode 34 and input electrode 35 of the glass substrate 42 may be connected by way of an anisotropic conductive film.

After connection of the integrated circuit 43, the operation in this liquid crystal display device is inspected, and in the normal integrated circuit 43, a sealing synthetic resin 38 is injected as shown in FIG. 8. Further, if the integrated circuit is found to be abnormal, it is, for example, removed and another integrated circuit is connected again.

Figure 11:
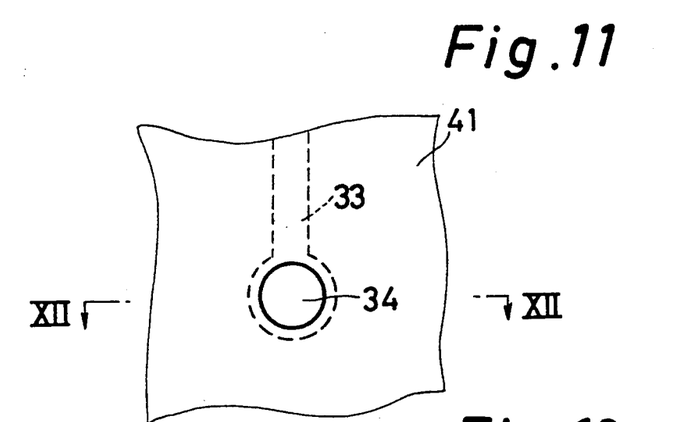
FIG. 11 is a plan view showing the structure near an output electrode 34 of the connecting structure shown in FIG. 7.
Figure 12:
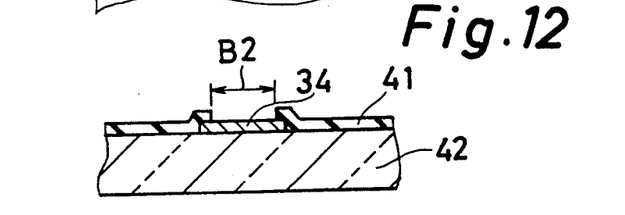
FIG. 12 is a sectional view seen from cutoff line XII—XII of FIG. 11.

FIG. 11 is a plan view showing the structure near the output electride 34 in the connecting structure described above. FIG. 12 is a sectional view seen from cutoff line XII—XII of FIG. 11. In this embodiment, the transparent insulation layer 41 if formed, overlaps with the output electrode 34 partly in the peripheral part of the output electrode 34. The bump electrode 37 is connected to the exposed region B2 of the output electrode 34.

Figure 13:
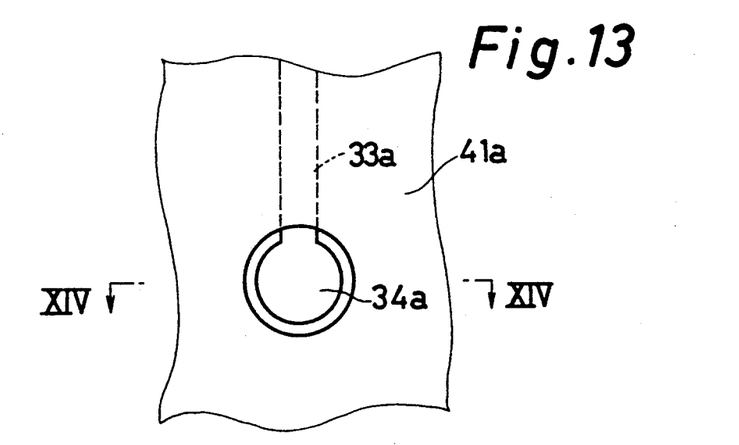
FIG. 13 is a plan view showing the structure near an output electrode 34a in a connection structure in a different embodiment of the invention.
Figure 14:
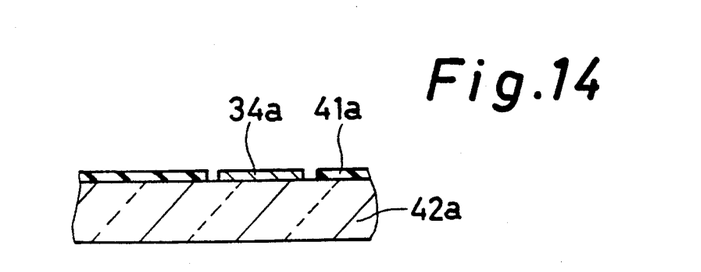
FIG. 14 is a sectional view seen from cutoff line XIV—XIV of FIG. 13.

FIG. 13 is a plan view showing the structure near the output electrode 34a of the liquid crystal display device in another different embodiment of the invention, FIG. 14 is a sectional view seen from cutoff line XIV—XIV of FIG. 13. In this embodiment, one difference from form the preceding embodiment is that the output electrode 34a and transparent insulation layer 41a do not overlap. The output conductor 33a which is manufactured in the same process as the output electrode 34a and extends in the display region from the output electrode 34a is overlapping with the transparent insulation layer 41a. That is, the output conductor 33a is covered with the transparent insulation layer.

In such liquid crystal display device, a flexible printed circuit (FPC) or the like including the common conductor for signal input is connected to the region B1 of the input terminal 36, and an input signal from outside is fed to this input terminal 36. This input signal is fed to the integrated circuit 43 through input electrode 35 and bump electrode 37. Afterwards, in the integrated circuit 43, various signal processings are completed, and an output signal corresponding to the input signal is delivered. This output signal is transmitted to the liquid crystal display unit from the bump electrode 37 of the integrated circuit 43 by way of the output electrode 34 and output conductor 33 on the glass substrate 42, so that a two-dimensional display is achieved.

Thus, in this embodiment, since the transparent insulation layer 41 is formed on the surface of output conductor 33, the insulation between conductors is enhanced, and leak between conductors and corrosion of conductors may be prevented. Further, leak of the bump electrode 37 and conductor 33 of the integrated circuit 43 due to defective positioning of the integrated circuit 43 may also be prevented.

The process of the transparent insulation layer 41 is included in the manufacturing process of the liquid crystal panel, and it is conducted simultaneously with the formation of transparent insulation film in the display region. Thus, the manufacturing process will not be complicated if the transparent insulation layer is formed in the region to be connected with the integrated circuit 43.

Further, according to this embodiment, since the transparent insulation layer 41 is patterned by photo etching, the pattern positioning precision and pattern forming precision are very excellent. Therefore, although fine conductors are formed on the glass substrate 42, arbitrary patterns can be formed depending on such fine conductor patterns. Hence, undesired short-circuit of conductors may be prevented. This transparent insulation layer 41 is, for example, SiO$_2$ or SiN$_x$, but other materials may be equally employed as far as applicable to fine processing of photolithography or the like in the liquid crystal panel forming process.

Figure 15:
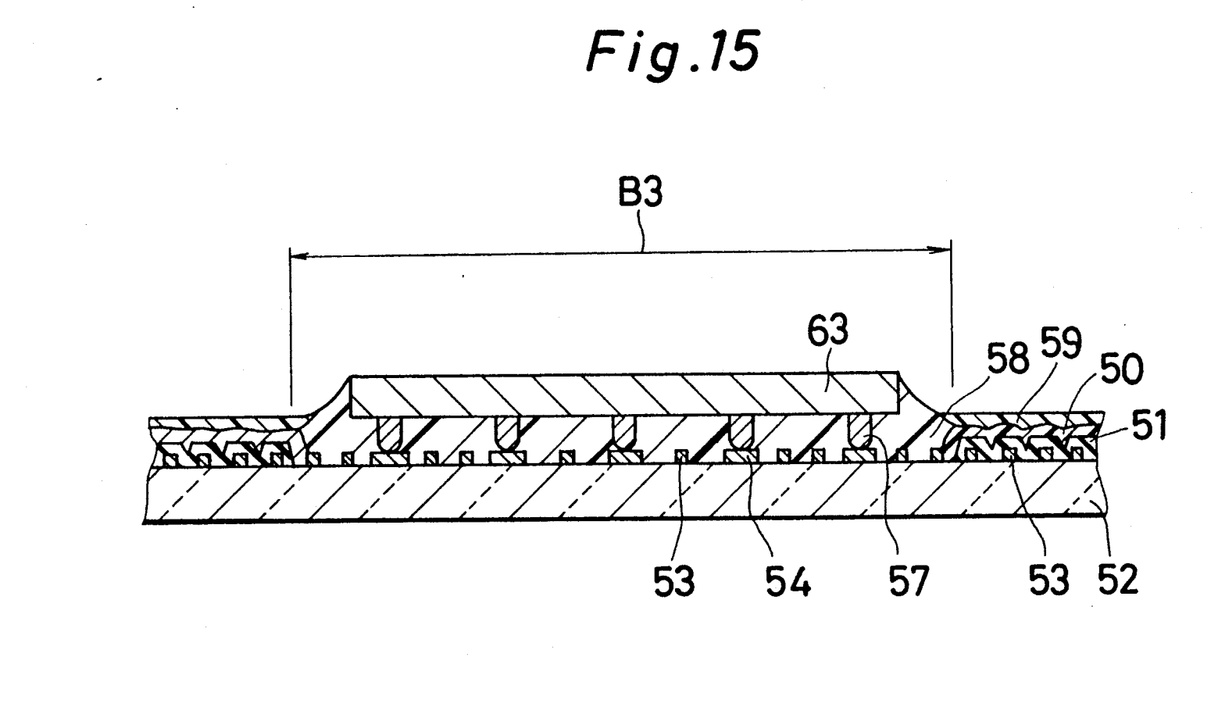
FIG. 15 is a sectional view showing a connecting structure of an integrated circuit 63 to a glass substrate 52 of a liquid crystal display device in a further preferred embodiment of the invention.

FIG. 15 is a sectional view showing the connecting structure of a glass substrate 52 and an integrated circuit 63 of a liquid crystal display device in another embodiment of the invention. In this embodiment, the transparent insulation layer 51 is not formed at all in the overlapped region B3 of the glass substrate 52 and integrated circuit 63. In the outside region of the integrated circuit 63, an orientation film 50 and the transparent insulation layer 51, to be formed in the forming process of liquid crystal panel, is formed. Specifically, between the integrated circuit 63 and the glass substrate 52, a synthetic resin 58 or the like is injected. Defective insulation of the output electrode 54 and output conductor 53 in the region B3 is prevented by this synthetic resin 58.

In the region other than the region B3, another synthetic resin 59 is applied, and leak between the output conductors 53 and corrosion of the output conductors 53 may be completely prevented.

In such constitution, if, for example, the adhesion between the transparent insulation layer 51 and synthetic resin 58 is inferior, the adhesion between the synthetic resin 58 and the glass substrate 52 or output conductor 53 is not lowered. Thus, an excellent connection between the integrated circuit 63 and glass substrate 52, in mechanical strength, is achieved.

Figure 16:
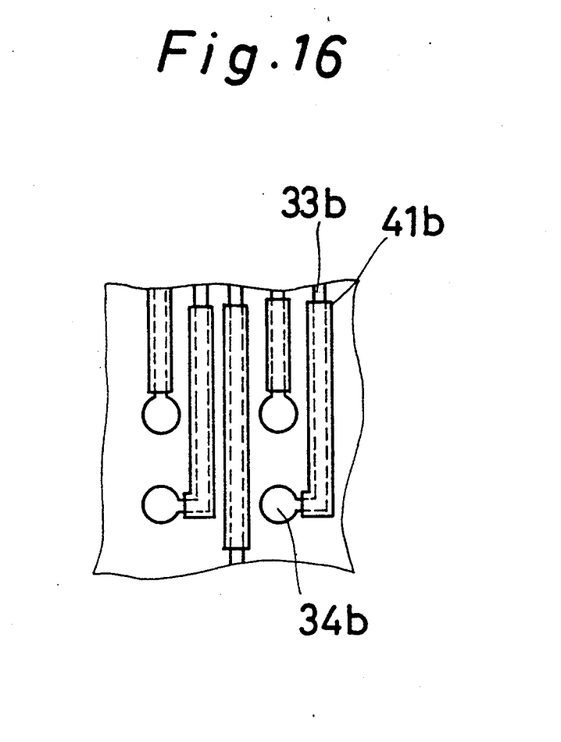
FIG. 16 and FIG. 17 are plan views showing the structure near output electrodes 34b, 34c in another different preferred embodiment of the invention.
Figure 17:
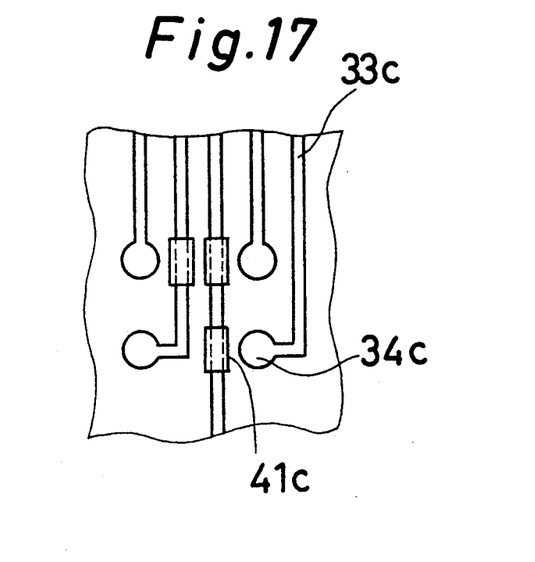

FIG. 16 and FIG. 17 are plan views showing the forming regions of output electrodes 34b, 34c, output conductors 33b, 33c, and transparent insulation layers 41b, 41c formed on the glass substrate opposite to the integrated circuit. In the embodiment shown in FIG. 15, although the transparent insulation film is not formed at all in the region B3, a transparent insulation layer 41b may be formed so as to cover the output conductor 33b along the output conductor 33b as shown in FIG. 16. According to the embodiment, since the transparent insulation layer 41b is patterned by photolithography, such fine patterns can be formed.

Incidentally, FIG. 17 shows a case of forming the transparent insulation layer 41c so as to cover only the portion likely to cause short-circuit or leak with the output electrode 34c in the output conductor 33c existing near the output electrode 34c.

In the embodiments shown in FIG. 16 and FIG. 17, even if the adhesion between the synthetic resin injected between the integrated circuit and glass substrate, and the transparent insulation layers 41b, 41c is inferior, the integrated circuit can be connected with a sufficient strength, and the defective insulation mentioned above can be prevented at the same time.

Thus, when directly connecting the integrated circuit to the glass substrate such as liquid crystal display device, defective insulation between conductors is prevented in the outer side conductor of the integrated circuit. At the same time, short-circuit and leak due to foreign deposit can be prevented. Therefore, the fine structure and high density of conductors may be achieved simultaneously. Also in the region overlapping with the integrated circuit of the glass substrate, short-circuit or leak of the connecting electrode and conductor due to deviation of positioning of the integrated circuit, and short-circuit between adjoining conductors due to excessive spreading of the conductive paste when conductive paste is used, can be prevented. Still further, since such a transparent insulation layer can be formed in the manufacturing process of the display panel, such effects are realized without complicating the manufacturing process.

Herein, embodiments of the invention in the liquid crystal display device are described, but this invention may be also embodied in other display devices, such as a plasma display device, an electroluminescence display device, and an electrochromic display device. Further, not limited to the display devices, it may be also applied in other electronic devices, as far as their manufacturing processes, includes a step of patterning the electric insulation film on the substrate by photo etching.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic apparatus including a plurality of conductors and an electrically insulating layer formed by photolithography, formed in this order, on an electrically insulating substrate, the apparatus further including an electronic device formed in an electronic device forming region on the electrically insulating substrate, connected to the plurality of conductors and the electrically insulating layer, the apparatus further comprising:
    electronic circuit components to which bonding electrodes are connected;
    the plurality of conductors being formed not only in the electronic device forming region but also in a region other than the electronic device forming region on the insulating substrate;
    the electrically insulating layer being formed so as to insulate the plurality of conductors formed in the region other than the electronic device forming region on the substrate, from each other; and
    the bonding electrodes being bonded to a bond region of the plurality of conductors not covered with the electrically insulating layer on the substrate, so as to electrically connect the electronic component to the plurality of conductors.

2. A liquid crystal display apparatus comprising:
    a liquid crystal display device having a pair of electrically insulating substrates mutually overlapping with an offset so as to form an overlapping region and a non-overlapping region, on each surface of the non-overlapping region, with, a plurality of conductors and an electrically insulating layer being formed by photolithography, formed in this order, and between the pair of substrates, a liquid crystal material being injected; and
    a plurality of electronic driving means, each including a plurality of bonding electrodes, connected to the non-overlapping regions of the substrates, for driving the liquid crystal device, wherein
    the electrically insulating layer and the plurality of conductors are selectively formed, in both the overlapping region and the non-overlapping region of the substrate respectively, and
    the bonding electrodes of the plurality of electronic driving means are each bonded, in bond regions, to the plurality of conductors, the plurality of conductors, in these bond regions, not being covered by the electrically insulating layer on each substrate so that the bonding electrodes are electrically connected to the plurality of conductors in the bond regions and the plurality of conductors are insulated from each other by the electrically insulating layer outside of the bond region.

3. The liquid crystal display apparatus of claim 2, wherein the plurality of electronic driving means include tape carriers to which integrated circuits are connected.

4. The liquid crystal display apparatus of claim 2, wherein the plurality of electronic driving means include integrated circuits bonded face down to the substrate.

5. The liquid crystal display apparatus of claim 4, wherein the electrically insulating layer is formed in all regions, except for the bond regions corresponding to the bonding electrodes of the integrated circuit, overlapped with the integrated circuits.

6. The liquid crystal display apparatus apparatus of claim 4, wherein the electrically insulating layer is formed by overlapping with the plurality of conductors in peripheral portions of the bond regions.

7. The liquid crystal display apparatus of claim 4, wherein the electrically insulating layer is formed so as to cover the plurality of conductors, except for the bond regions, in the regions overlapped with the integrated circuits.

8. The liquid crystal display apparatus of claim 4, wherein the electrically insulating layer is formed so as to cover a portion of the plurality of conductors near the bond regions, in the regions overlapped with the integrated circuit.

9. The liquid crystal display apparatus of claim 4, wherein an electrically insulating synthetic resin is injected between the integrated circuits and the substrate, after connecting the integrated circuits to the substrate.

10. A method for fabricating a display apparatus comprising the steps of:
    forming a plurality of conductors on a substrate having a display device forming region;
    forming, selectively, an electrically insulating layer by photolithography in both the display device forming region on the circuit substrate and in regions other than the display device forming region, selectively;
    forming a display device including the substrate, the plurality of conductors and the electrically insulating layer, in the display device forming region; and
    bonding, in a bond region, where the electrically insulating layer is not formed, the plurality of conductors to bonding electrodes of an electronic circuit component to thereby electrically connect the plurality of conductors with an electronic circuit component in the bonding region and electrically insulate the plurality of conductors from each other in an area external to the bonding region.

11. The method for fabricating a display apparatus of claim 10, wherein the step of forming the electrically insulating layer comprises:
    forming a thin layer made of one of $SiO_2$ and $SiN_x$ by one of a sputtering and CVD method; and
    patterning this thin layer by a photolithographic technique, whereby the electrically insulating layer is selectively formed on the substrate so as to electrical insulate the plurality of conductors from each other in the area external to the bonding region.

12. A method for bonding an electronic circuit component to an electrically insulating substrate having an electronic device forming region, wherein a plurality of conductors and an electrically insulating layer are formed in this sequence by photolithography, and an electronic device is formed in the electronic device forming region, together with the plurality of conductors and electrically insulating layer, comprising the steps of:
    forming, selectively by photolithography, the electrically insulating layer in both the electronic device forming region and in a region other than the electronic device forming region on the electronic insulating substrate; and forming, in a region other than the electronic device forming region of the electrically insulating layer, bonding electrodes connected to the electronic circuit component, connected to the plurality of conductors on the substrate such that the electrically insulating layer is not formed in the region connecting the plurality of bonding electrodes and the plurality of conductors to ensure electrical connection between the plurality of bonding electrodes and the plurality of conductors and electrical insulation between each of the plurality of conductors.

* * * * *